US012562393B2

(12) United States Patent
Howey et al.

(10) Patent No.: US 12,562,393 B2
(45) Date of Patent: Feb. 24, 2026

(54) METHOD FOR OPERATING A FUEL CELL SYSTEM, SHUTOFF VALVE AND FUEL CELL STACK

(71) Applicant: Robert Bosch GmbH, Stuttgart (DE)

(72) Inventors: Friedrich Howey, Ditzingen (DE); Dirk Schnittger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 972 days.

(21) Appl. No.: 17/772,588

(22) PCT Filed: Oct. 9, 2020

(86) PCT No.: PCT/EP2020/078358
§ 371 (c)(1),
(2) Date: Apr. 28, 2022

(87) PCT Pub. No.: WO2021/083636
PCT Pub. Date: May 6, 2021

(65) Prior Publication Data
US 2023/0045282 A1 Feb. 9, 2023

(30) Foreign Application Priority Data
Oct. 29, 2019 (DE) .................... 10 2019 216 655.5

(51) Int. Cl.
*H01M 8/04089* (2016.01)
*H01M 8/04082* (2016.01)
*H01M 8/04746* (2016.01)

(52) U.S. Cl.
CPC ... *H01M 8/04089* (2013.01); *H01M 8/04201* (2013.01); *H01M 8/04753* (2013.01)

(58) Field of Classification Search
CPC ......... H01M 8/04089; H01M 8/04082; H01M 8/04746
See application file for complete search history.

(56) References Cited

U.S. PATENT DOCUMENTS 5,961,045 A    10/1999    Coldren et al.
6,240,907 B1    6/2001    Schwarz
(Continued)

FOREIGN PATENT DOCUMENTS

CN    101542803 A    9/2009
CN    101631979 A    1/2010
(Continued)

OTHER PUBLICATIONS

Translation of International Search Report for Application No. PCT/EP2020/078358 dated Jan. 28, 2021 (2 pages).

*Primary Examiner* — Karie O'Neill Apicella
(74) *Attorney, Agent, or Firm* — Michael Best & Friedrich LLP

(57) ABSTRACT

The invention relates to a method for operating a fuel cell system, in which method a supply of air to a fuel cell stack (20) is interrupted intermittently, in particular in the event of a standstill of the system, by means of a pressure-controlled shutoff valve (1), which comprises a valve element (4), which valve element can be moved back and forth between two end positions and is preloaded toward a sealing seat (3) by means of the spring force of a closing spring (2). According to the invention, in at least one of the two end positions, the valve element is held in the end position in question additionally by means of the magnetic force of an electromagnet (5) and/or of a permanent magnet (6), the electromagnet (5) and/or the permanent magnet (6) interacting with a magnetic or magnetizable part (7) of the valve element (4). The invention further relates to a shutoff valve (1) suitable for carrying out the method according to the invention and to a fuel cell stack (20) having at least one shutoff valve (1) according to the invention.

15 Claims, 3 Drawing Sheets

(56)                    References Cited

U.S. PATENT DOCUMENTS

Figure 1:
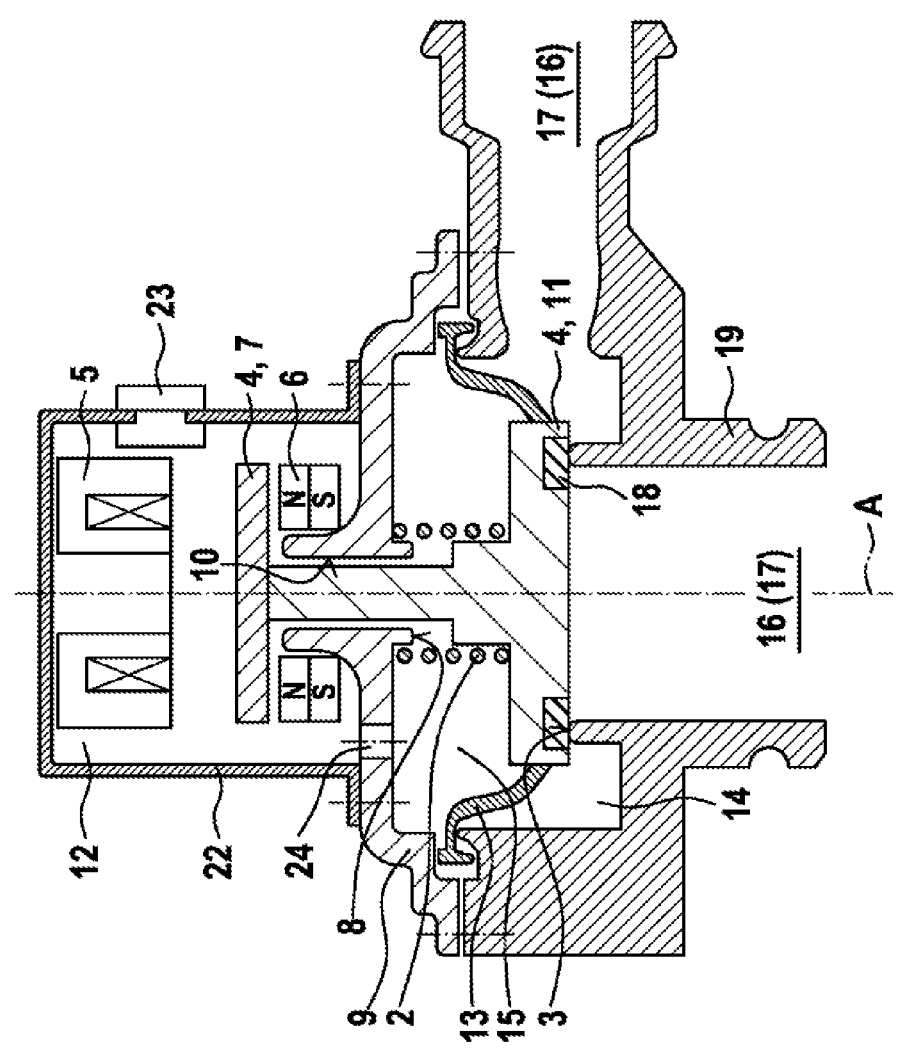
Figure 1:
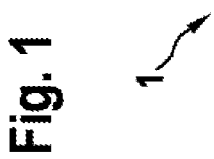

| | | | | |
|---|---|---|---|---|
| 2013/0175462 | A1* | 7/2013 | Suzuki | F16K 39/024 |
| | | | | 251/30.01 |
| 2021/0148485 | A1* | 5/2021 | Magel | H01M 8/04089 |

FOREIGN PATENT DOCUMENTS

| | | | | | |
|---|---|---|---|---|---|
| CN | 104520947 | A | 4/2015 | | |
| CN | 109416003 | A | 3/2019 | | |
| CN | 110131467 | A | 8/2019 | | |
| DE | 102007023659 | A1 | 12/2008 | | |
| DE | 112007002775 | T5 | 10/2009 | | |
| DE | 102015206202 | A1 | 10/2016 | | |
| DE | 102015206206 | A1 | 10/2016 | | |
| DE | 102017209125 | A1 | 12/2018 | | |
| DE | 102017210364 | A1 | 12/2018 | | |
| DE | 102017212725 | A1 | 1/2019 | | |
| DE | 102017213754 | A1 | 2/2019 | | |
| EP | 3280901 | A1 | 2/2018 | | |
| WO | WO-2018233909 | A1 * | 12/2018 | | F16K 1/36 |

* cited by examiner

METHOD FOR OPERATING A FUEL CELL SYSTEM, SHUTOFF VALVE AND FUEL CELL STACK

The invention concerns a method for operating a fuel cell system. In the method, a supply of air to a fuel cell stack of the fuel cell system is interrupted intermittently, in particular during a shutdown of the system, by means of a pressure-controlled shut-off valve. The invention furthermore concerns a pressure-controlled shut-off valve which is suitable for performance of the method, and a fuel cell stack with a shut-off valve according to the invention.

PRIOR ART

In a fuel cell system, valves are required which interrupt the connection of a fuel cell stack to an air supply during a shutdown. This prevents air or oxygen continuing to reach the cathode side of a membrane arranged between a cathode and an anode. This air diffuses through the membrane from the cathode side onto the anode side and when the system is restarted, leads to an "air-to-air start" which is harmful for the fuel cell system.

The air supply may be interrupted for example by means of valves which are configured as simple check valves. Such valves are controlled solely by the applied pressure or the prevailing flow conditions. This means they are passive. Thus there is no need for actuators for active control of the valve opening, which is associated with advantages in terms of installation space and cost. However, the design of the spring force of a spring acting in the closing direction is problematic, since this must be firstly sufficiently large to hold the check valve securely closed but secondly not so large as to delay the opening of the valve on a system restart. After an interruption of the air supply, a 100% air through-flow should be re-established as quickly as possible in order to avoid temporary local differences in the fuel cells, which may lead to degradation of the system.

This is the object of the present invention. To achieve this object, the method is proposed with the features of claim 1, the shut-off valve with the features of claim 5, and the fuel cell stack with the features of claim 12. Advantageous refinements of the invention are given in the respective subclaims.

DISCLOSURE OF THE INVENTION

With the proposed method for operating a fuel cell system, a supply of air to a fuel cell stack is interrupted intermittently, in particular during a shutdown of the system, by means of a pressure-controlled shut-off valve comprising a valve element which can be moved back and forth between two end positions and is preloaded in the direction of a sealing seat by the spring force of a closing spring. According to the invention, in at least one of the two end positions, the valve element is additionally held in the respective end position by the magnetic force of an electromagnet and/or of a permanent magnet, wherein the electromagnet and/or the permanent magnet co-operate(s) with a magnetic or mag-netizable part of the valve element.

In the proposed method, a shut-off valve is used which is controlled by the applied pressure and thus behaves as a passive valve. In contrast to conventional passive valves however, by means of an electromagnet and/or by means of a permanent magnet, an additional magnetic force can be created which achieves a holding force when the valve element of the shut-off valve is in one of the two end positions. Accordingly, a spring force and at least one magnetic force act on the valve element, wherein preferably the effect of the magnetic force on the valve element is merely temporary, in particular restricted to the time during which the valve element is in an end position.

The magnetic force generated by means of the electro-magnet and/or by means of the permanent magnet may act in the closing direction so that it supports the closing spring. In this case, the closing spring may be designed smaller so that the shut-off valve opens more quickly when the pressure rises.

The magnetic force generated by means of the electro-magnet and/or by means of the permanent magnet may act in the opening direction, so that the shut-off valve is held securely open against the spring force of the closing spring. This is advantageous in particular if, for example under partial load, the volume flow passing through the shut-off valve is significantly smaller so there is a risk that the closing spring will unintentionally close the valve.

Preferably, with the proposed method, both an electro-magnet and a permanent magnet are used. Preferably, a first magnetic force is generated by means of the electromagnet, and a second magnetic force which opposes the first mag-netic force is generated by means of the permanent magnet. In this way, an additional holding force can be exerted on the valve element in both end positions of the valve element.

Advantageously, by means of the magnetic force of the electromagnet, the valve element is held in an end position in which the shut-off valve is open. The electromagnet is accordingly energized when the shut-off valve is open. To allow closure of the valve, the power supply to the electric magnet is ended so that the closing spring can return the valve element to the sealing seat.

If the prevailing pressure conditions ensure that the valve remains open even without energizing of the electromagnet, the electromagnet can be or remain deactivated so that the power required for energizing is saved.

Preferably, by means of the magnetic force of the perma-nent magnet, the valve element is held in an end position in which the shut-off valve is closed. The permanent magnet thus supports the closing spring so this can be designed smaller. In the closed position, preferably the effect of the permanent magnet on the valve element is great, while it diminishes on opening of the shut-off valve since the valve element is moving away from the permanent magnet. Thus the effect of the permanent magnet can be restricted sub-stantially to the closing period of the shut-off valve.

In a refinement of the invention, it is proposed that the valve element is loaded with ambient pressure in the closing direction. The shut-off valve thus opens against the spring force of the closing spring and against ambient pressure. Since the total system pressure is usually higher than the ambient pressure, this pressure difference has an opening effect. Under some circumstances therefore, an electromag-net for generating an additional holding force on the open valve element may be omitted.

In addition, a pressure-controlled shut-off valve is pro-posed for intermittently interrupting the air supply to a fuel cell stack in a fuel cell system. The shut-off valve comprises a valve element which can be moved back and forth between two end positions and is preloaded in the direction of a sealing seat by the spring force of a closing spring, wherein the sealing seat defines a first end position and a housing-side stroke stop defines a second end position. According to the invention, in at least one of the two end positions, the magnetic force of an electromagnet and/or of a permanent magnet acts on a magnetic or magnetizable part of the valve element.

The proposed pressure-controlled shut-off valve is particularly suitable for performance of the above-described method according to the invention, so that by means of the proposed shut-off valve, substantially the same advantages can be achieved as by means of the above-described method according to the invention. In particular, a pressure-controlled valve may be provided which seals tightly and remains closed as long as the magnetic force exerts an additional holding force on the valve element. If the magnetic force acts in a closing direction, the spring force of the closing spring can be reduced, so that at the same time, a faster opening of the shut-off valve can be achieved. If the magnetic force acts in an opening direction, the shut-off valve can be securely held open even with low volume flows through the valve.

According to a preferred embodiment of the invention, the magnetic force of the electromagnet counters the spring force of the closing spring. Accordingly, by means of the magnetic force of the electromagnet, the open shut-off valve can be securely held open. To allow closure of the shut-off valve, the power supply to the electromagnet is simply ended so that the closing spring returns the valve element to the sealing seat.

Alternatively or additionally, it is proposed that the magnetic force of the permanent magnet acts in the direction of the spring force of the closing spring. The permanent magnet thus supports the closing spring, which may accordingly be designed smaller.

Advantageously, the shut-off valve comprises both an electromagnet and a permanent magnet, so that an additional magnetic force acts on the valve element in both end positions of the valve element in order to hold this in the respective end position. Energizing of the electromagnet may be omitted if the prevailing pressure conditions ensure that the valve remains open. In this way, the energizing power can be saved.

It is furthermore proposed that the valve element passes through a housing part which forms the stroke stop and/or a guide for the valve element. The housing part may also serve to support the closing spring, wherein for example this may be a coil compression spring surrounding the valve element in regions. At the other end, the closing spring may be supported on a radially protruding part of the valve element.

Preferably, the valve element has at one end a valve plate which cooperates with a sealing seat, and at the other end the magnetic or magnetizable part which is preferably also configured plate-like. The magnetic or magnetizable part may in particular be an anchor plate which is fixedly connected to the valve element. The multipiece design of the valve element has the advantage that installation of the shut-off valve is simplified.

Further preferably, the magnetic or magnetizable part of the valve element together with the electromagnet and/or the permanent magnet is accommodated in a pressure chamber in which ambient pressure prevails. Thus ambient pressure bears on the valve element at one end and system pressure at the other end. Since the system pressure is usually higher than the ambient pressure, an additional opening force may be achieved via the pressure difference.

Advantageously, at its end facing the sealing seat, the valve element is surrounded by a sealing membrane which is radially outwardly attached on the housing side, so that the sealing membrane separates a valve chamber from a spring chamber in which the closing spring is received. The spring chamber is preferably connected via at least one connecting channel to the pressure chamber in which ambient pressure prevails, so that ambient pressure also prevails in the spring chamber. This ensures that, if the system pressure in the valve chamber lies above ambient pressure, a force acting on the valve element in the opening direction is maintained.

In a preferred embodiment, the shut-off valve has an inlet channel and an outlet channel which are arranged at an angle, preferably a right angle, to one another. The shut-off valve may accordingly be attached to a fuel cell stack of the fuel cell system in various positions or orientations. Thus the volume flow into the fuel cell stack or from the fuel cell stack can be interrupted by means of the shut-off valve.

The fuel cell stack, which is also proposed for achieving the object cited initially, comprises at least one shut-off valve according to the invention, wherein preferably the at least one shut-off valve is indirectly attached to the fuel cell stack via an adapter plate. The at least one shut-off valve may be attached axially or radially. If more than one shut-off valve is provided, these may be oriented similarly so that all shut-off valves have an axial or radial inflow. Furthermore, the orientation of at least two shut-off valves may differ, so that at least one shut-off valve has an axial inflow and at least one further shut-off valve has a radial inflow.

Figure 2:
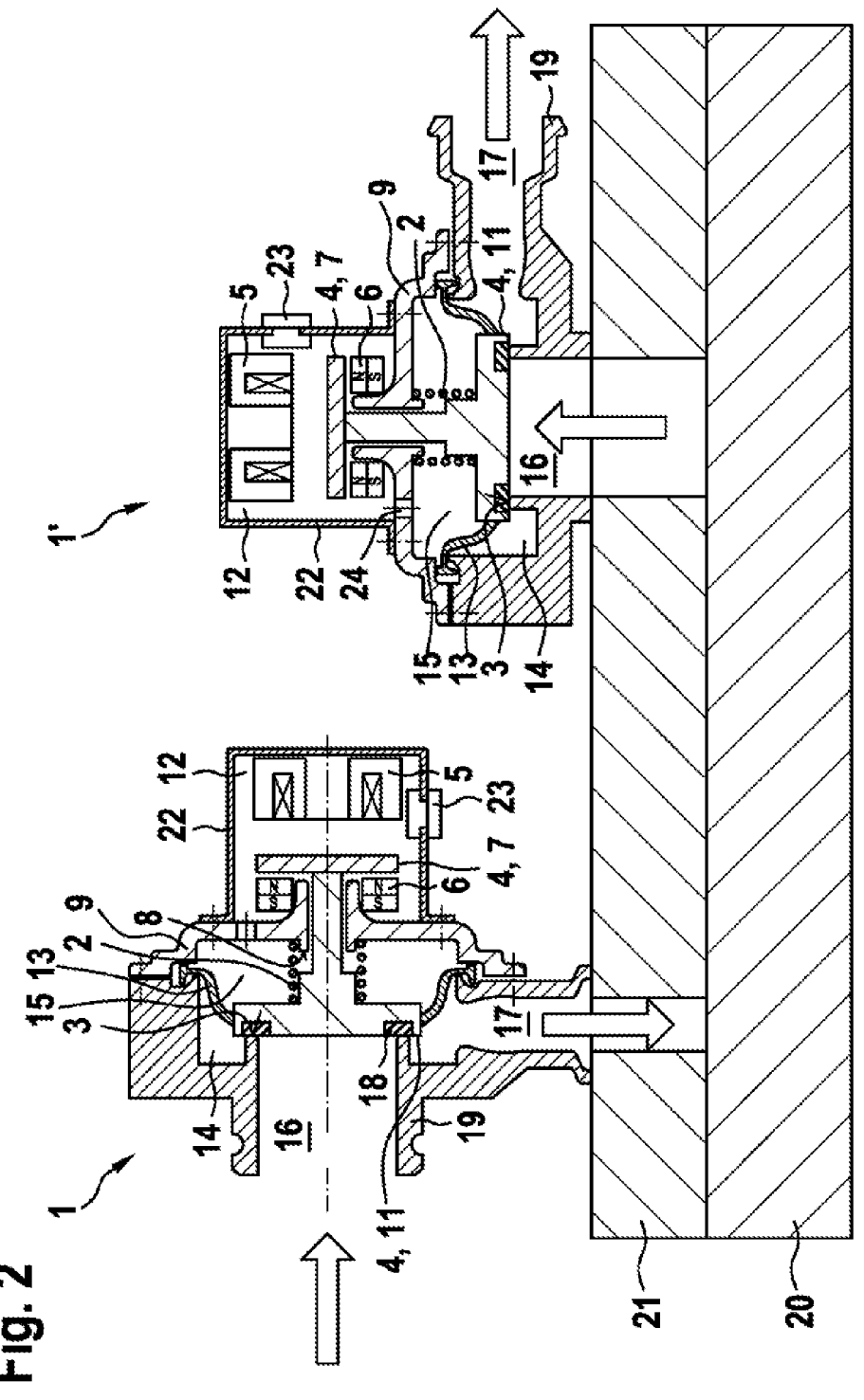
Figure 3:
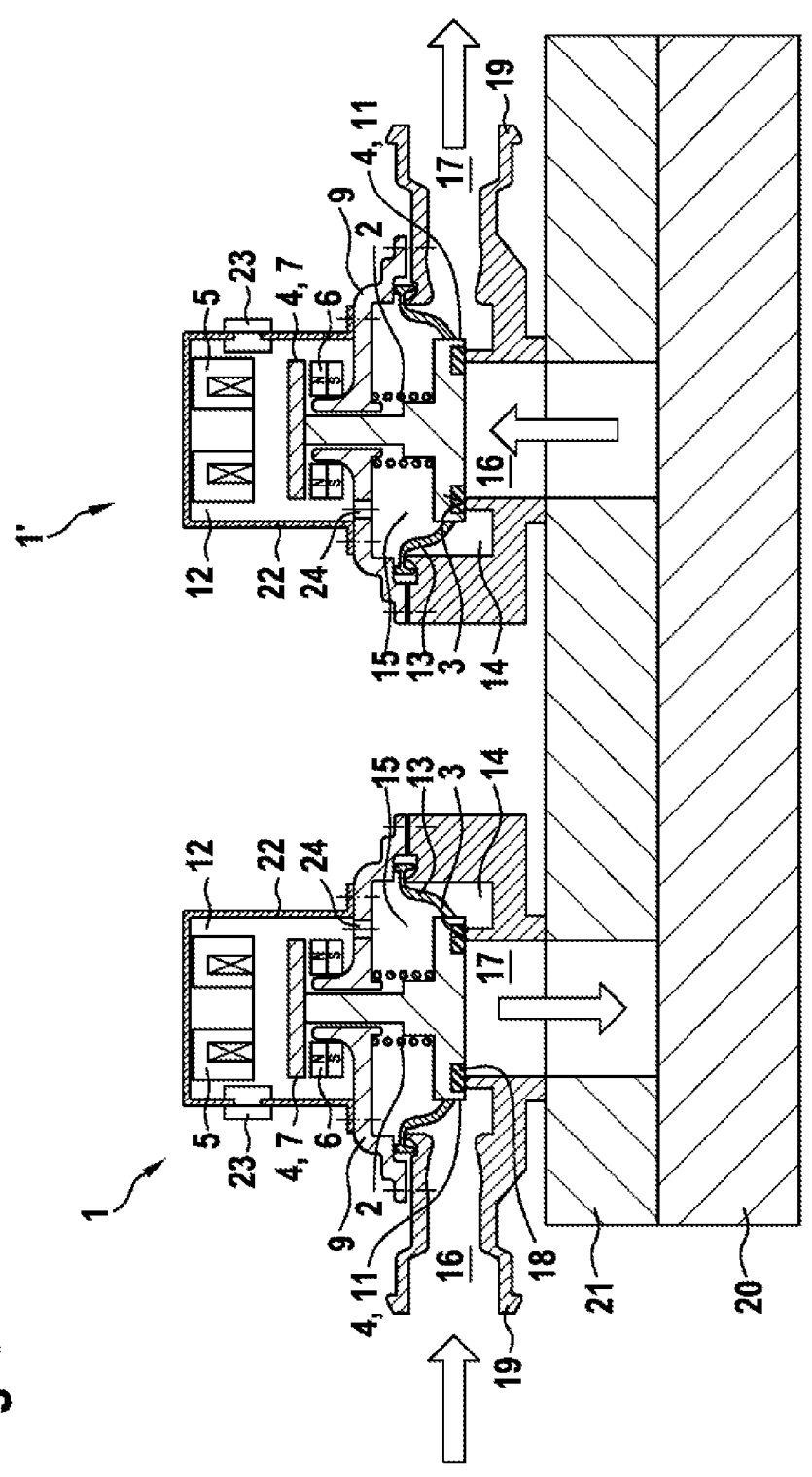

A preferred embodiment of the invention is explained in more detail below with reference to the appended drawings. These show:

FIG. 1 a schematic longitudinal section through a shut-off valve according to the invention, FIG. 2 a schematic longitudinal section through two shut-off valves according to FIG. 1 attached to a fuel cell stack, and FIG. 3 a schematic longitudinal section through two shut-off valves according to FIG. 1 attached to a fuel cell stack, wherein the orientation of one shut-off valve has been changed relative to FIG. 2.

DETAILED DESCRIPTION OF THE DRAWINGS

The pressure-controlled shut-off valve 1 shown in FIG. 1 comprises a valve element 4 which can be moved back and forth between two end positions, wherein the first end position is defined by a sealing seat 3 and the second end position by a stroke stop 8. The sealing seat 3 is formed by a first housing part 19, wherein the sealing seat 3 delimits an inlet channel 16 or outlet channel 17, depending on whether the shut-off valve 1 has an axial or a radial inflow. Both are possible. If the shut-off valve 1 has an axial inflow, the sealing seat 3 delimits the inlet channel 16, wherein the outlet channel 17 is arranged at an angle, in the present case at a right angle, to the inlet channel 16. If the shut-off valve 1 has a radial inflow, the inlet channel 16 runs radially and the sealing seat 3 delimits the axially running outlet channel 17 (see reference signs in brackets). The axial orientation is defined by a longitudinal axis A of the shut-off valve 1.

To optimize the shut-off function, the valve element 4 comprises an elastic sealing element 18 which cooperates with the sealing seat 3 and is let into an end-side valve plate 11 of the valve element 4. A closing spring 2 also rests on the valve plate 11, and its spring force axially preloads the valve element 4 against the sealing seat 3. At the other end, the closing spring 2 is supported on a second housing part 9 which also forms the stroke stop 8 for the valve element 4. At the same time, the housing part 9 forms a guide 10 for the valve element 4, which for this purpose is partially received in the housing part 9.

In the region of the valve plate 11, the valve element 4 is surrounded by a sealing membrane 13. By deviation from the illustrated embodiment, the sealing membrane 13 and the sealing element 18, provided on the end face of the valve plate 11, may also be formed as one piece. For example, the sealing membrane 13 may be attached to the valve plate 11 by means of a vulcanizing process such that it simultaneously forms the end-side sealing element 18.

In the embodiment illustrated, the sealing membrane 13 separates a valve chamber 14 from a spring chamber 15 in which the closing spring 2 is received. The spring chamber 15 is connected via at least one connecting channel 24, formed in the housing part 9, to a pressure chamber 12 which is delimited by a cover part 22 connected to the housing part 9. A pressure-balancing element 23, which is provided on the cover part 22, ensures that ambient pressure prevails in the pressure chamber 12. Since, in the present case, the valve element 4 is guided into the pressure chamber 12, ambient pressure prevails at one end and the respective system pressure at the other end. In order to open the shut-off valve 1, the pressure difference between the ambient pressure and the system pressure must be sufficiently large to overcome the spring force of the closing spring 2. A small spring force accordingly has an advantageous effect with respect to rapid opening of the shut-off valve 1.

In order to be able to reduce the spring force of the closing spring 2, the shut-off valve 1 shown in FIG. 1 comprises an electromagnet 5 and a permanent magnet 6, which each act on a magnetic or magnetizable part 7 of the valve element 4. This part 7 is an anchor plate which is fixedly connected to the valve element 4 at the end opposite the valve plate 11. The anchor plate is thus arranged in the pressure chamber 12 which at the same time receives the electromagnet 5 and permanent magnet 6 at an axial distance from one another. The axial distance ensures that the effect of the permanent magnet 6 on the anchor plate is greatest when the valve element 4 is in the first end position, i.e. when the shut-off valve 1 is closed. As the opening stroke increases, the anchor plate moves away from the permanent magnet 6, so the effect no longer exists or is minimal in the second end position. The magnetic force of the permanent magnet 6 accordingly provides an additional holding force which guarantees a secure closure of the shut-off valve 1. This in turn has the advantage that the spring force of the closing spring 2 can be reduced. In order to create an additional holding force which acts on the valve element 4 in the second end position, the electromagnet 5 is energized. In the second end position, the magnetic force of the electromagnet 5 ensures that the shut-off valve 1 remains securely open irrespective of the prevailing pressure conditions. To close the shut-off valve 1, the power supply to the electromagnet 5 is simply ended, so that the spring force of the closing spring 2 returns the valve element 4 to the sealing seat 3.

FIGS. 2 and 3 show different mounting variants of the shut-off valve 1 according to the invention on a fuel cell stack 20. Mounting takes place indirectly via an adapter plate 21.

As illustrated as an example in FIG. 2, a first shut-off valve 1, which serves for air supply to the fuel cell stack 20, may be mounted radially so that it has an axial inflow. A second shut-off valve 1', which extracts used air from the fuel cell stack 20 and is structured identically to shut-off valve 1 (same reference sign), may be mounted axially and have an axial inflow.

If the mounting situation is the same in both cases, the arrangement shown in FIG. 3 may be selected. Here, both shut-off valves 1, 1' are mounted axially, wherein the shutoff valve 1 has a radial inflow and the shut-off valve 1' has an axial inflow. In the shut-off valve 1, the pressure present at the sealing membrane 13 exerts the opening force.

What is claimed is:

1. A method for operating a fuel cell system, in which a supply of air to a fuel cell stack (20) is interrupted intermittently by a pressure-controlled shut-off valve (1) comprising a valve element (4) which can be moved back and forth between a first end position and a second end position, and is preloaded in a direction of a sealing seat (3) by a spring force of a closing spring (2), wherein in the first end position in which the shut-off valve (1) is closed, the valve element (4) is additionally held in the first end position by a magnetic force of a permanent magnet (6), wherein the permanent magnet (6) co-operates with a magnetic or magnetizable part (7) of the valve element (4).

2. The method as claimed in claim 1, wherein by the magnetic force of an electromagnet (5), the valve element (4) is held in the second end position in which the shut-off valve (1) is open.

3. The method as claimed in claim 1, wherein the valve element (4) is loaded with ambient pressure in a closing direction.

4. A pressure-controlled shut-off valve (1) for intermittently interrupting the air supply to a fuel cell stack (20) in a fuel cell system, the shut-off valve (1) comprising a valve element (4) which is configured to be moved back and forth between two end positions and is preloaded in a direction of a sealing seat (3) by a spring force of a closing spring (2), wherein the sealing seat (3) defines a first end position and a housing-side stroke stop (8) defines a second end position, wherein in the first end position, the magnetic force of a permanent magnet (6) acts on a magnetic or magnetizable part (7) of the valve element (4) in a direction of the spring force of the closing spring (2).

5. The shut-off valve (1) as claimed in claim 4, wherein the magnetic force of an electromagnet (5) counters the spring force of the closing spring (2) to move the valve element (4) to the second end position.

6. The shut-off valve (1) as claimed in claim 4, wherein the valve element (4) passes through a housing part (9) which forms the stroke stop (8) and/or a guide (10) for the valve element (4).

7. The shut-off valve (1) as claimed in claim 4, wherein the valve element (4) has at one end a valve plate (11) which cooperates with the sealing seat (3).

8. The shut-off valve (1) as claimed in claim 4, wherein the magnetic or magnetizable part (7) of the valve element (4) together with an electromagnet (5) and/or the permanent magnet (6) is accommodated in a pressure chamber (12) in which ambient pressure prevails.

9. The shut-off valve (1) as claimed in claim 4, wherein the shut-off valve (1) has an inlet channel (16) and an outlet channel (17) which are arranged at an angle to one another.

10. An apparatus comprising a fuel cell stack (20) and at least one shut-off valve (1) as claimed in claim 4.

11. The method as claimed in claim 1, wherein the supply of air to the fuel cell stack (20) is interrupted intermittently during a shutdown of the fuel cell system.

12. The shut-off valve (1) as claimed in claim 4, wherein the valve element (4) has at one end a valve plate (11) which cooperates with the sealing seat (3), and at an other end the magnetic or magnetizable part (7) is plate-like.

13. The shut-off valve (1) as claimed in claim 4, wherein the shut-off valve (1) has an inlet channel (16) and an outlet channel (17) which are arranged at a right angle to one another.

14. An apparatus comprising a fuel cell stack (20) and at least one shut-off valve (1) as claimed in claim 4, wherein the at least one shut-off valve (1) is attached to the fuel cell stack (20) via an adapter plate (21).

15. A pressure-controlled shut-off valve (1) for intermittently interrupting the air supply to a fuel cell stack (20) in a fuel cell system, the shut-off valve (1) comprising a valve element (4) which is configured to be moved back and forth between two end positions and is preloaded in a direction of a sealing seat (3) by a spring force of a closing spring (2), wherein the sealing seat (3) defines a first end position and a housing-side stroke stop (8) defines a second end position, wherein in the first end position, the magnetic force of a permanent magnet (6) acts on a magnetic or magnetizable part (7) of the valve element (4) in a direction of the spring force of the closing spring (2), wherein at an end facing the sealing seat (3), the valve element (4) is surrounded by a sealing membrane (13) which is radially outwardly attached on a housing side, so that the sealing membrane (13) separates a valve chamber (14) from a spring chamber (15) in which the closing spring (2) is received.

\*　\*　\*　\*　\*